2,990,240
Patented June 27, 1961

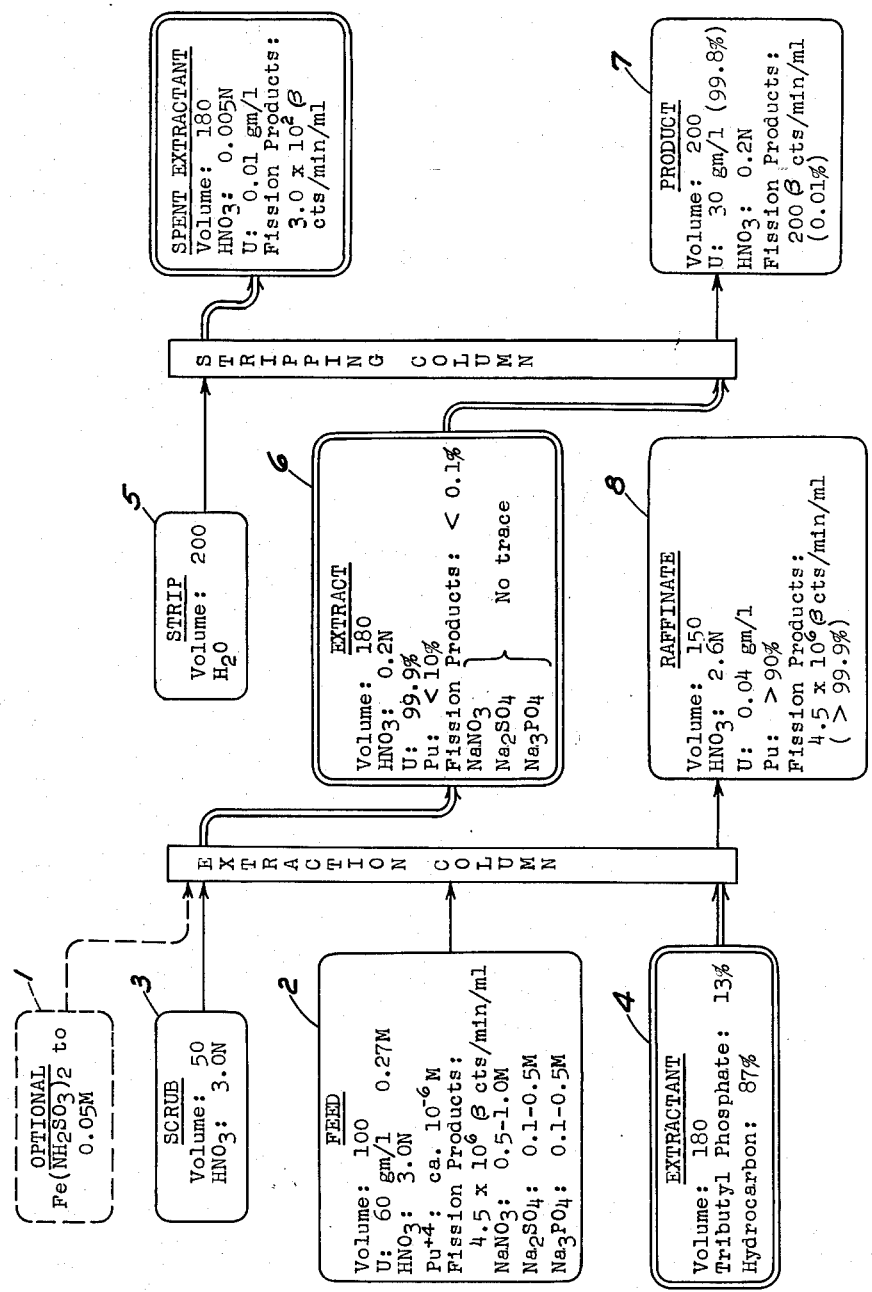

2,990,240
PROCESS FOR SEGREGATING URANIUM FROM PLUTONIUM AND FISSION-PRODUCT CONTAMINATION
Charles V. Ellison, Oak Ridge, Tenn., and Thomas C. Runion, Hamilton, Ohio, assignors to the United States of America as represented by the United States Atomic Energy Commission
Filed Aug. 11, 1952, Ser. No. 303,692
14 Claims. (Cl. 23—14.5)

The present invention relates in general to processes for the decontamination and recovery of uranium values, and more particularly to a solvent extraction process for selectively separating uranium values from an aqueous solution containing the same together with contaminating plutonium and fission product values.

As is known, in certain uranium processing operations and applications, there obtain bulks of uranium values which are contaminated with plutonium and uranium-fission-product values, most often present in very minor relative proportions, and which are frequently also contaminated with soluble alkali salts—largely, sodium nitrate, phosphate, sulfate, and carbonate—from which the uranium values are desired to be quite sharply separated and rather completely recovered. Such circumstance is encountered particularly, for example, in conventional processes for the production of plutonium. Plutonium—more specifically the 239 isotope of plutonium—is customarily produced by transmutation of uranium effected by subjecting natural uranium metal to neutron irradiation; this is usually done by disposing the uranium, in metallic form, as a portion of a supercritical amassment of fissionable material in a nuclear reactor. In current practice, the product thus obtained is ordinarily a mass of irradiated uranium containing a concentration of the order of 0.02% plutonium and a like concentration of uranium fission products. Since the presence of even small amounts of uranium or fission products usually interferes with the ultimate applications of plutonium, the preponderance of the produced plutonium must be isolated in high purity. Employing customary procedures, most of the plutonium is initially separated quite readily from the bulk of uranium and from much of the fission product contamination. This is accomplished by dissolving the irradiated mass in aqueous nitric acid, solubly complexing the uranium by introducing sulfate ions into the solution, and removing from solution the often-minute concentration of plutonium in its tetravalent state by carrier precipitation upon bismuth phosphate; the bismuth phosphate is precipitated by means of introducing bismuth nitrate plus a large excess of phosphoric acid, thereby carrying the plutonium values from solution therewith, while the solubly-complexed uranium, and the fission products, largely remain behind in solution. Conventionally, the plutonium-bearing carrier precipitate is separated by centrifugation or the like and is passed on to extensive further processing for ultimate isolation of its plutonium content. As for the supernatant, bearing the bulk of the uranium and fission-products, along with some residual plutonium contamination, however, this for years has customarily been merely collected in capacious underground tanks, to await the advent of a more opportune time, and the finding of a process by which decontamination and recovery of the uranium away from the contaminating plutonium and fission products would be practically feasible. It has been customary, before storing underground, to avoid corrosion of the metal tanks by neutralizing the acid supernatant with an alkali hydroxide—in particular, sodium hydroxide. Such neutralization has concomitantly incurred considerable uranium precipitation, mostly as uranyl phosphate; the precipitate formed is thereupon dissolved by incorporating sodium carbonate to solubly complex the uranium. Upon storage, the liquids so derived have slowly deposited considerable volumes of a loose sludge comprising readily-soluble, carbonate-complexed uranium; compositions of such stored conglomerate tend largely along the lines of the typical analysis tabulated in Table I below.

*Table I*

TYPICAL COMPOSITION OF ACCUMULATED CONGLOMERATE OF CONTAMINATED URANIUM VALUES
[About ⅔ volume supernatant and ⅓ volume sludge]

| Ionic (grams per liter) | Supernatant, g./l. | Sludge, g./l. |
|---|---|---|
| U | 0.02– 20 | 475–540 |
| Na | 50–110 | 140–170 |
| $NO_3$ | 13– 23 | 20– 45 |
| $CO_3$ | 27– 34 | 50– 70 |
| $PO_4$ | 2.4– 9 | 90–220 |
| $SO_4$ | 100–225 | 100–220 |

| Radiochemical (counts per minute per gram Uranium) | | |
|---|---|---|
| Gross $\beta$ [1] | $0.5 \times 10^9$–$2.5 \times 10^9$ | $0.5 \times 10^9$–$2.2 \times 10^9$ |
| Gross $\gamma$ [1] | $1.5 \times 10^8$–$6.5 \times 10^8$ | $3.5 \times 10^5$–$6.0 \times 10^5$ |
| Zr $\beta$ [2] | $2.9 \times 10^5$–$5.7 \times 10^5$ | $3.5 \times 10^6$–$4.8 \times 10^6$ |
| Ru $\beta$ [2] | $0.8 \times 10^5$–$5.3 \times 10^5$ | $0.5 \times 10^7$–$4.3 \times 10^7$ |
| Nb $\beta$ [2] | $0.1 \times 10^7$–$1.4 \times 10^7$ | $0.5 \times 10^6$–$1.5 \times 10^6$ |
| Total Rare Earth $\beta$ [2] | $2.3 \times 10^5$–$5.7 \times 10^5$ | $0.3 \times 10^9$–$1.3 \times 10^9$ |
| Ce $\beta$ [2] | $3.5 \times 10^8$–$5.2 \times 10^8$ | $7.2 \times 10^9$–$9.2 \times 10^9$ |
| Sr $\beta$ [2] | $0.8 \times 10^7$–$2.8 \times 10^7$ | $0.5 \times 10^8$–$4.0 \times 10^8$ |
| Cs $\beta$ [2] | $0.25 \times 10^8$–$1.3 \times 10^9$ | $0.5 \times 10^7$–$8.3 \times 10^7$ |
| Pu $\alpha$ | $0.15 \times 10^6$–$1.2 \times 10^6$ | $0.9 \times 10^5$–$1.6 \times 10^5$ |

[1] $\beta$ and $\gamma$ activity largely attributable to, and representative of, fission product values.
[2] Important individual fission product species and groupings.

Now, after several years, the whole of such stored conglomerate represents a very sizeable and ever-expanding cache of valuable uranium, the isolation of which for reuse in the irradiation operation is particularly desirable.

For the most part, the accumulated conglomerate, and as well the new quantities of uranium-containing acid supernatant continually arriving for storage, are characterized by containing plutonium in a proportion too small to warrant separate recovery and isolation at present, but yet in physiologically toxic amounts too large to be tolerable in uranium fabrication operations. Similarly, the fission-products—isotopes having atomic numbers ranging predominately from 30 to 63—although present in only a trace concentration, are in general radioactive and therefore greatly hazardous from both physiological and technological standpoints. Consequently, to render the stored uranium fit for practical utilization, separation from most of this hazardous plutonium and fission product contamination is imperative. As an ancillary requirement, since storage in heavily radiation-shielded containers of any removed plutonium and fission products is required for radiological safety reasons, it is important that these contaminants be removed in a form as concentratable as practicable, toward maintaining ultimate shielded-volume requirements within reasonable bounds; for convenience in handling, the contaminants should best be stored entirely in liquid state. In view of the ever-increasing demands for uranium, and the ever-increasing accumulation of contaminated bulk of uranium values, there has been a growing desire that new, effective means be found for simply and efficiently separating uranium values from plutonium and fission product values, as well as from contaminating alkali salts, particularly on large scale and in continuous operation.

Accordingly, one object of the present invention is to provide an improved process for the separation of uranium values from an aqueous solution containing the same together with undesirable, contaminating plutonium and fission products, as well as from alkali salt contamination.

Another object is to provide such a process wherein a simple organic solvent extraction followed by a simple stripping operation affords sharp and substantially complete separation of the uranium, with practical efficiency.

A further object is to provide such a process which is particularly adapted to such separation from accumulated conglomerates of alkali-neutralized and carbonate-complexed, uranium-containing supernatants, as are encountered in a conventional plutonium production operation.

Still another object is to provide such a process wherein the segregated uranium values are delivered in plain, aqueous solution, whereby they are ideally adapted to immediate further processing.

Yet another object is to provide such a process which does not require the incorporation of high concentrations of extraneous precipitable salting agents in the aqueous phase for effective extraction, and wherein, as a result, the separated plutonium and fission product values are delivered in a solution form readily adapted to several fold reduction in solution volume by means of evaporation, without incurring undesirable crystallization of solutes.

Yet a further object is to provide such a process which may simply be repeated, to afford further substantial enhancement in the purity of the separated uranium values.

Again another object is to provide such a process which is of practical fitness and suitability appropriate for large scale application, and which may be conducted in truly continuous operation.

Additional objects will become apparent hereinafter.

In accordance with the present invention, a new and improved method for separating and separately recovering uranium values, from an aqueous solution containing the same together with plutonium and fission product values, comprises intimately contacting said solution, while maintaining a substantial concentration of nitric acid in the solution, with an organic extractant comprising a minor volumetric proportion of a substantially water-immiscible liquid trialkyl phosphate, dissolved in a major volumetric proportion of a substantially water-immiscible, non-polar, liquid, saturated, organic solvent of density distinctly different from that of water, and maintaining said intimate contact until said organic extractant acquires a concentration of uranium values of at least 70% of the maximum saturation concentration in such uranium values that the extractant can ultimately attain, thereby preferentially extracting uranium values into the organic phase, separating the resulting uranium-bearing organic extract from the remaining plutonium-containing and fission-product-containing aqueous solution, thereupon intimately contacting the separated uranium-bearing organic extract with water, thereby stripping uranium values therefrom, and thereafter separating the resulting stripped-uranium-containing aqueous phase from the spent organic extractant.

Applicants have found such specially compounded organic extractant—minor proportion of tri-alkyl phosphate dissolved in a non-polar liquid organic solvent—to possess, uniquely, a number of concurrent, propitious characteristics, which are brought into beneficial cooperation by the instant process. First, applicants have discovered that the extractability into such extractant, in the presence of such substantial aqueous $HNO_3$ concentration, of plutonium in all of its positive valence states, markedly decreases as the degree of saturation in uranium, that the extractant is permitted to attain, exceeds 70%. That is, above 70%, the high uranium saturation in the organic phase exerts a pronounced force toward displacing and driving from the organic phase any plutonium which may earlier have been extracted, and rejecting and repelling plutonium then tending to enter the extractant. Evidently, uranium has a considerably greater affinity for such extractant than does plutonium, as is demonstrated in the preferentiality of the extractant in readily accepting further uranium at the expense of forcefully displacing extracted plutonium back into the aqueous phase; indeed, as 100% saturation in uranium is approached, almost all plutonium is excluded from the extractant. A similar effect obtains in the case of the fission products; while under any condition of extractant saturation quite little of the fission product contamination present will extract, yet in proceeding to above 70% saturation of the extractant in uranium, even this little amount is markedly decreased, with virtually all fission product contamination being excluded as the uranium saturation approaches 100%. The degree of extractant saturation in uranium attained is regulated by the parameters of the extraction operation, such as concentration of uranium in the aqueous feed, ratio of tri-alkyl phosphate to non-polar solvent in the extractant, volumetric ratio of organic to aqueous phases, duration of contacting, number of contacting stages, and concentrations of whatever salting out agents may be present in the aqueous phase. However, the degree of saturation is readily measurable by chemical analysis, so that upon such basis, one or more of these parameters may be appropriately adjusted to afford attainment of a degree of saturation within the particular range of practical advantage, as found by applicants, commencing at 70%. As a result, extraction under such high degree of ultimate uranium saturation has proven to consistently afford separation of uranium in virtually quantitative yield and high purity away from fission products and plutonium—even from $Pu^{+4}$, which, by itself, manifests a strong propensity towards being extracted by the instant extractant. For example, in applying applicants' extraction-stripping operation to an aqueous nitric acid feed solution of uranium values contaminated with plutonium and fission product values, comparable to solutions encountered in usual plutonium production operations, employing a laboratory batchwise countercurrent extraction of five stages, extraction of over 99% of the uranium, along with less than 1% of the total fission product and only a minor proportion of the plutonium values present, is typically attained. Upon extending such countercurrent batch procedure to larger, practical-scale operations, with further process refinement, uranium recoveries of 99.6%, along with elimination of 90% of the contaminating plutonium values, and reduction of the fission product contamination to the low order of $10^{-4}$ of that initially present, has proven regularly afforded by a single extraction cycle of the instant process.

Furthermore, it has been found that sharper separation is obtainable by maintaining the plutonium values in a positive valence state other than the tetravalent—for example, the hexavalent or, preferably, the trivalent state—during the extraction. Both hexavalent and trivalent plutonium values have been determined to manifest, in general, quite little tendency to extract. By maintaining the plutonium in one of such valence states during an extraction of uranium under conditions of greater than 70% ultimate uranium saturation, this effect significantly contributes to further mitigating any coextraction of plutonium with the uranium; in addition, of course, the high uranium saturation of the solvent continues to effectively militate against any coextraction of fission products. Hence, in further accordance with the present invention, a new and improved method for separating and separately recovering uranium values from an aqueous solution containing the same together with contaminating plutonium and fission product values, comprises intimately contacting said solution, while maintaining a substantial concentration of nitric acid in the solution and maintaining said plutonium values therein in a positive valence state selected from the group consisting of the trivalent and hexavalent states, with an organic extractant comprising a minor volumetric proportion of a substantially water-immiscible liquid trialkyl phosphate, dissolved in a major proportion of a substantially water-immiscible, non-polar, liquid, saturated, organic solvent of density distinctly different from that of water, and maintaining said intimate contact until said organic extractant acquires a concentration of uranium values of at least 70% of the maximum saturation concentration in such uranium values that the extractant can ultimately attain, thereby preferentially extracting uranium values into the organic phase, separating the resulting uranium-bearing organic extract from the remaining plutonium-containing and fission-product-containing aqueous solution, thereupon intimately contacting the separated uranium-bearing organic extract with water, thereby stripping uranium values therefrom, and thereafter separating the stripped-uranium-containing aqueous phase from the resulting spent organic extractant. In this manner, a uranium product of exceptional purity from plutonium and fission products is attained in a single extraction. For example, employing refined, plant-scale, continuous, countercurrent, multi-stage, packed-column contacting and incorporating ferrous sulfamate to 0.05 molar as a reductant to maintain all plutonium values in precisely the trivalent state during extraction, recovery of as much as 99.8% of the uranium values, with reduction in its fission product and plutonium contamination by factors of $10^4$ and 40 respectively, were typically accomplished.

Following extraction, uranium in the extract has demonstrated to be readily stripped with water, affording a simple aqueous solution of the segregated uranium product in form suitable for immediate use or further processing. Such stripping has been found to be further aided by dilution of the tri-alkyl phosphate with non-polar organic solvents—which in general are, by themselves, quite poor extractants for uranium and plutonium, particularly when the dilution is of such extent that the tri-alkyl phosphate is in minor volumetric portion. Furthermore, it has been determined that such dilution, when employed in the initial extraction, is particularly beneficial in promoting convenient attainment of ultimate extract saturation of greater than 70% in uranium. In addition, by employing a non-polar organic solvent of density distinctly different from that of water, and perhaps also less viscous than the alkyl phosphate, the increased density differential between the organic and aqueous phases, and possibly decreased organic viscosity, hastens stratification and otherwise advantageously renders the operation more adaptable to continuous contacting techniques. Moreover, the extractability of uranium from aqueous solution into tri-alkyl phosphate is found to be markedly favored, and extraction accelerated, by increased aqueous nitrate ion concentration; exceptionally, so much so that uranium extractability is much more favorably responsive to an increase in nitrate ion concentration than it is adversely affected by equivalent increase in hydrogen ion concentration. Consequently, with tri-alkyl phosphate, in contradistinction to other conventional solvents, moderate concentrations of nitric acid alone may effectively be employed to drive the desired values largely into the organic extractant. Accordingly, the $HNO_3$ may be employed by itself, in place of precipitable nitrate salts or to complement any nitrate salts already existing in the uranium solution. Since $HNO_3$ is volatile, the aqueous raffinate from the initial extraction, containing the bulk of the plutonium and fission product values, may be extensively evaporated before any adverse crystallization of solutes is incurred, thereby affording exceedingly compact subsequent plutonium and fission product storage, and at the same time affording advantageous recovery of much of the nitric acid for reuse in the process. As for the adaptability of the operation to solutions of conglomerates as defined in Table I, supra, the extractant has demonstrated to favorably possess extraction and stability properties not significantly affected adversely by aqueous concentrations of nitric acid and/or of sulfate and phosphate ions of so high as ½ molar—about the highest normally encountered in such conglomerates. Being of such efficiency, and having such beneficial attributes, the present process clearly affords substantial practical advantages in uranium decontamination and recovery.

In conducting the present process, the operational cycle consists, in its essence, of simply: (a) an organic solvent extraction of uranium from an aqueous solution of uranium, plutonium, and fission products, and (b) an aqueous stripping of the uranium from the resulting extract. Considering, first, the organic extraction, the compositions of aqueous plutonium-uranium-fission product solutions favorable to effective extraction of uranium away from the plutonium and fission products are subject to wide variation. In the normal situation, where the uranium concentration ordinarily exceeds that of the plutonium and fission products by several orders of magnitude, aqueous uranium concentration within the approximate range of 0.05 to 1.5 molar are preferred, with about 0.25 molar being the apparent optimum. When derived from conglomerates as alluded to hereinbefore, such uranium concentrations normally have associated with them plutonium concentrations of the order of $10^{-5}$ to $10^{-7}$ molar, and about $10^{-4}$ to $10^{-6}$ molar concentrations of fission products; the latter are by no means insignificant, however, for they manifest radioactivity so intense as ca. $10^9$ counts per minute per gram of uranium in beta rays, and $10^5$ to $10^6$ millivots per milliliter in gamma radiation. To effectively displace the uranium distribution coefficient well toward the organic solvent, it is highly important that the solution should include a substantial content of nitric acid; 1 to 7 molar is preferred, with about 3 molar being especially appropriate. The amount of uranium extracted, and the degree of saturation attained in the extract, markedly improves with increase in $HNO_3$ and overall nitrate ion concentrations. Within the preferred range, lower concentrations of $HNO_3$ are sufficient for effective salting when the concentration in the solution of nitrate salts—which are also effective in salting out uranium—increases. Total nitrate concentrations within the same general range are appropriate. However, it is best to maintain as high a nitric acid concentration as practicable, to counteract any complexing of the uranium by sulfates or phosphates in the aqueous solution, which would seriously detract from extraction efficiency. For example, it is found that in the case of aqueous phosphate and sulfate ion concentrations of about 0.4 molar, as are usually encountered in conventional solution of contaminated uranium conglomerates, about 3 molar $HNO_3$ at least is needed to assure substantially quantitative uranium recovery, while 5 to 6 molar $HNO_3$ should be used when 0.6 to 0.7 molar sulfate and phosphate concentrations are encountered. In simple nitric acid solutions of this nature, uranium ions dissolved therein will normally assume the uranyl oxidation state, and most of the plutonium will be present in tetravalent state.

Aqueous solutions having the foregoing characteristics may be readily derived from contaminated uranium conglomerates of the sort represented in Table I. Such sodium-carbonate-complexed solution, part of which has deposited as a sludge, is readily removable from storage tanks by agitation, and pumping out as a thin slurry; rather complete dissolution of the solids may then be effected by adding 70% nitric acid to about 3 to 5 molar. Naturally, copious evolution of carbon dioxide attends such acidification of the carbonate solution; ordinarily the evolved gases should be completely absorbed to avoid radiologically hazardous escape of highly-radioactive fission products entrained therein. Clarification of the resulting solution by filtration, employing a diatomaceous earth filter aid, is effective in removing suspended silicaceous, and other, foreign matter. Derivation by direct acidification in this manner normally results in uranium concentrations so low as 0.1 to 0.25 molar. An alternative derivation method, affording somewhat greater uranium concentrations, may be effected by adding 70% nitric acid or sulfuric acid merely to pH 5 to 6.5, and then digesting the conglomerate slurry at near its boiling point for several hours, whereupon the uranium quantitatively precipitates to 40% of the slurry volume in the form of mixed phosphates and uranates, primarily sodium uranyl phosphate. The precipitate settles rapidly, and upon separation is readily soluble in nitric acid, providing a solution ca. 0.4–0.5 molar in uranium. A second alternative derivation method affording uranium concentrations of this order comprises addition of excess sodium hydroxide to the uranium slurry also to precipitate mixed phosphates and uranates, which readily dissolve in nitric acid. This precipitate, however, frequently manifests undesirably slow settling characteristics. It has been experienced that excess silica creates phase separation difficulties and should thus be initially eliminated to below 0.15 gram per 100 grams of uranium; for this, digestion for about 3 hours at 95° to 100° C. and then filtering, is effective. In any event, such digestion in acid solution at an elevated temperature is also beneficial in converting any polymerized plutonium to monomeric form, thereby rendering it most responsive to oxidants or reductants which may be incorporated during the extraction operation. Similarly, where the contaminated uranium is encountered at the outset in metallic or solid compound form, other conventional dissolution techniques are ordinarily available.

The constitution of the organic extractant of the present invention is also subject to considerable variation. The tri-alkyl phosphate employed should be a liquid at room temperature, and should preferably comprise at least twelve carbon atoms among its alkyl radicals to provide adequate water immiscibility. Among the variety of suitable members of this class, tri-n-butyl phosphate has proven particularly efficacious. To constitute the present extractant, tri-butyl phosphate is dissolved in a substantially water-immiscible, non-polar, liquid, saturated, organic solvent having a density distinctly different from that of water—that is, a density below about 0.9, or above about 1.1 grams per cm.$^3$ While carbon tetrachloride, methyl cyclohexane, and benzene exemplify satisfactory solvents, that particularly preferred is a substantially water-immiscible paraffinic hydrocarbon which is liquid at room temperature and desirably has a density within the range of about 0.6 to 0.9 gm./cm.$^3$ and a viscosity at least as low as water. Alkane homologues ranging from hexane, heptane and octane, on up through tetradecane, especially the normal isomers, are well suited. Mixtures of hydrocarbons are not objectionable; use of petroleum cuts in the gasoline-kerosene range is convenient and economical. Particularly preferred are petroleum naphthas having a density of about 0.75 g./cc., boiling range of 300°–400° F., or somewhat lower, and a flash point of about 120° F.; these are sold under such trade names as "Amsco 123–15," "Gulf BT," "Varsol," "Esso 107," "Shell HFMS," "DeoBase," and others. A typical composition of such napthas is about 60% paraffins, 30% naphthenes, and 10% aromatics. Extractant dilutions within the approximate volumetric range of 5% to 50% tributyl phosphate in the solvent are suitable. Above 30% tributyl phosphate, however, an adverse tendency of the extractant to form stable emulsions is occasionally encountered. 15% tributyl phosphate dissolved in 85% hydrocarbon has given eminently satisfactory results, especially since the important extractant relative-saturation of more than 70% in uranium is then more easily obtained at the aqueous uranium concentrations normally encountered, and since the distribution coefficients of uranium in stripping advantageously become considerably less than 1 upon employing dilutions below about 20% tributyl phosphate. The presence of mon-, and di-, -butyl phosphates—impurities often found in tributyl phosphate—should be avoided; even small amounts deleteriously tend to draw and bind the plutonium and fission products exceptionally strongly into the extractant, and also disadvantageously tend to hold large portions of the extracted uranium in an unstrippable form in the extract.

To effect the extraction, the organic extractant is intimately contacted with the aqueous solution containing the desired uranium values. Virtually any conventional solvent-extraction contacting means, for instance, separatory funnels, mixer-settlers, packed columns, pulse-columns, or the like, may be used. Employing such means, counter-current contacting, preferably continuous, is particularly effective; several contacting stages—about 5 to 6—are normally enough to achieve extraction of over 95% of the uranium, while leaving about the same percentages of total fission products and plutonium behind in the aqueous phase. Since the extraction will closely approach equilibrium in less than 10 seconds, contact duration of about 1 minute per stage is usually more than adequate. A fundamental requirement for maximum purity of the segregated uranium is that the process be operated under conditions such that the extractant phase approaches complete saturation in uranium, since the extraction of plutonium and fission products is then at a minimum. 80 to 90% saturation, however, is normally the practical optimum. The exact uranium content which will completely saturate tributyl phosphate varies somewhat with the aqueous concentration of uranium, the dilution of the extractant, the composition of the aqueous phase, the temperature, and the like, but, overall, it generally approximates ½ mole uranium per mole of tributyl phosphate. The volume of organic extractant employed should desirably be a little larger than that of the aqueous phase, hence organic:aqueous ratios of between 1:1 and 2:1 are appropriate with 1.5:1 being the apparent optimum; within this range, the most advantageous ratio to be employed depends appreciably upon the aqueous uranium concentration—the primary aim, of course, being to attain greater than 70% saturation of the extract in uranium. This extraction equilibrium is found to be not appreciably effected by temperature change within the preferred range of 10° to 50° C.

In conjunction with the extraction, it has been found highly beneficial to substantially decrease the fission product contamination of the extract, by scrubbing the obtained organic extract with a moderately concentrated nitric acid solution. The extract is intimately contacted with a small amount of aqueous nitric acid solution having about the same $HNO_3$ concentration as that in the feed; thereby, much of whatever fission products have been extracted are removed from the extract, while the nitric acid content of the scrubbing solution effectively restrains the bulk of uranium from leaving the extract. Since the nitric acid content of the scrubbing solution also tends to restrain plutonium from leaving the extract, scrubbing is not as effective in increasing elimination of plutonium contamination. The $HNO_3$ concentration in the scrubbing solution is best maintained above 1 to 2 molar to avoid any substantial transfer of uranium to the aqueous scrubbings; about 3 molar $HNO_3$ is preferred. While an alkali nitrate salt, such as sodium nitrate, may be substituted for part or all of the nitric acid in the scrub solution, to afford somewhat the same fission product decontamination, this is ordinarily quite undesirable, for the presence of such precipitable salt will seriously interfere with subsequent concentration of the aqueous-fission-product-containing scrubbings. In continuous operation, the resulting, fission-product-containing scrubbings are simply added to the feed solution stream. In vertical packed-column operation, scrub acid is introduced to the top, organic extractant (in the case where it has a density less than water) is introduced at the bottom, and the aqueous feed is introduced at a point part way down the column. Thus, in the upper portion of the column, the aqueous scrub acid flows downward into contact with the upflowing extract, thereby scrubbing the extract, and upon reaching the feed-point it commingles with the aqueous feed flowing downward through the upflowing stream of organic extractant in the lower portion, thereby undergoing extraction. At most, about 4 to 6 counter-current scrub stages are all that are warranted. In continuous operation, since the scrubbings are added to the feed stream, it has been found appropriate, in order to retain the preferable organic:aqueous volumetric ratio of 1.5:1 in the extraction operation, to maintain the volumes of feed:organic:scrub in approximately the ratio 4:9:2.

For even sharper separation of the uranium from the plutonium contamination, the alternative procedure, in accordance with the present invention, of maintaining the plutonium values in trivalent or hexavalent states rather than its usual tetravalent state, during the extraction and scrubbing operation, may be applied. This is accomplished by incorporating into the aqueous feed solution, into the aqueous scrubbing solution, or both, a reducing agent effective for reducing tetravalent plutonium to the trivalent state, or an oxidant effective for oxidizing tetravalent plutonium to hexavalent state. The plutonium is thereupon reduced or oxidized to $Pu^{+3}$ or $Pu^{+6}$, the distribution coefficients of which between non-polar-solvent-diluted tributyl phosphate and the aqueous solution have been found markedly lower than that of $Pu^{+4}$. Reduction to $Pu^{+3}$ is especially effective in this respect; the distribution coefficient of $Pu^{+3}$, when present above, is of the very low order of 0.01 between the extractant and moderantly concentrated aqueous nitric acid, and the almost complete saturation of the extractant with uranium greatly depresses $Pu^{+3}$ extraction even further. While a wide variety of acid-soluble strong reductants are known to be applicable to the reduction of $Pu^{+4}$ to $Pu^{+3}$, ferrous sulfamate has proven to be eminently efficacious. Other satisfactory reducing agents include: oxalic acid; hydroxylamine sulfate; ferrous ammonium sulfate plus sulfamic acid; and even photochemical reduction, effected by mere thorough exposure of the aqueous solution, equilibrated with the extractant, to strong daylight or better ultraviolet light. Since the plutonium is ordinarily present in only trace concentrations, the concentration of reductant incorporated may satisfactorily be quite low; in the cases of the aforementioned chemical reductants, concentrations of about 0.02 to 0.05 molar are usually sufficient. In continuous operation, it is particularly effective to incorporate the sulfamate in the scrub solution; then, the reductant solution can strip any plutonium from the extract in the scrubbing operation, as well as subsequently commingling with the feed solution to suppress any initial extraction of plutonium values. However, with 5 or 6 extraction stages, incorporation of the reductant merely in the feed solution is generally satisfactory for restraining virtually all plutonium from undergoing extraction. Under such procedure, scrubbing of the extract for elimination of plutonium becomes largely unnecessary, so that in some instances it is profitable to delete scrubbing entirely; thereupon, considerable economizing in nitric acid is a result, although the final product will usually be about three times as contaminated with fission products. In the case of employing oxidation to $Pu^{+6}$, the procedure is much the same, with ceric ammonium sulfate together with sodium dichromate—say, 0.05 molar each—as the oxidant.

The scrubbed uranium-bearing extract is thereupon treated to recover the separated uranium values therein. This is simply accomplished by contacting the extract with water—preferably demineralized or distilled—which, in the absence of nitric acid to maintain the high distribution coefficient of uranium toward the organic phase, is quite effective in stripping the uranium therefrom. Toward effecting maximum removal of the relatively large quantity of uranium which ordinarily obtains, it is preferred to employ a volume of water at least as great as the volume of organic extract, with a little more being preferable. In such case, about 5 or 6 countercurrent contacting stages, of duration of the order of a minute or even less, each are appropriate for high uranium recoveries. Uranium losses in the spent extractant are generally less than 0.1%. However, it has been further discovered that incorporating just a small amount of sulfuric acid—preferably to about 0.001 molar—in the uranium-stripping water is remarkably effective in reducing the amount of uranium left unstripped in such case of low order of ca. 0.0001%. Heating during stripping has been found to afford somewhat more favorable uranium distribution coefficients; however, elevated temperature stripping is best avoided, in view of the volatility of the organic extractant.

At this point, having completed applicants' basic extraction-stripping cycle, substantially all of the initial uranium has been segregated, freed of most all of its initial plutonium contamination, freed of several orders of magnitude of fission product contamination, and normally freed of any detectable trace of phosphate and sulfate. It has been segregated as a simple aqueous solution of uranyl nitrate, quite convenient for further processing. Normally obtaining with uranium concentrations so low as 0.2 to 0.4 molar, the solution is readily concentratable ten fold by evaporation. Usually, such solution of strip uranium is acceptable as the final product of the process. On the other hand, in the event that fission product and/or plutonium contamination is still too high for acceptance, the aqueous solution of stripped uranium may, in further accordance with the present invention, be treated by one or more repetitions of the basic extraction-stripping cycle for further decontamination. Moreover, it has been found that after one cycle, over ¾ of the small amount of fission product radioactivity still contaminating the product comprises, specifically, ruthenium and zirconium values, which generally tend to follow uranium through extraction operations. Accordingly, it is also advantageous to apply special removal techniques for these particular elemental values to complement repetition of the present basic cycle.

The aqueous raffinate from the extraction contains the bulk of the fission products and plutonium, in trace concentrations and in aqueous nitric acid solution, which may be concentrated by evaporating until the incipience of crystallization of solutes is incurred. Being so concentrated, the evaporated fission product and plutonium solution may then be stored, with great economy of shielded storage volume, to await subsidence of its radioactivity and perhaps some future processing for recovering its meager content of plutonium. Since any traces of organic therein are volatile and evaporate early, normally no explosible compositions obtain during the evaporation. Profitably, virtually all of the vapors evolved in the evaporation may be condensed and recovered; the volatile $HNO_3$, along with the water, in the solution is thereupon retrieved as distillate for reuse in constituting subsequent feed and scrubbing solutions in the cycle. The acidity of the distilland progressively increases as the distillation proceeds, and, where the initial salt concentration is low, such that high acid concentrations obtain before incipient crystallization forces termination of the evaporation, evolution of considerable amounts of beta-emitting fission products—predominantly ruthenium values—will commence. In such case, to avoid undesirable fission product loss, distillation is preferably terminated upon the distilland's attaining about a 9 molar concentration in $HNO_3$; this usually amounts to a volume reduction of more than 95%, with a distillation recovery of over 75% of the initial $HNO_3$ content. On plant scale, the problem of apparatus corrosion in boiling and condensing the moderantly high concentrations of nitric acid becomes troublesome; in some cases it has proven more practical to merely neutralize the raffinate and then evaporate, abandoning any effort toward $HNO_3$ recovery.

Also, some success has been achieved in effecting further concentration through gradual crystallization and then removal of sodium nitrate from the evaporated raffinate. A single crystallization has proven capable of removing over 90% of the sodium nitrate, contaminated with only 1% of the fission products present, with further decontamination being afforded by repeated crystallizations.

Also, at the end of the basic cycle, the organic extractant has been stripped of most all of the materials that it had extracted, and thus may be directly recycled for reuse as fresh extractant at the beginning of the cycle. While in plant scale operation the extractant has proven to be satisfactorily reusable at least a dozen times and for periods of at least a week, it has been found best to periodically process all spent organic extractant to purify it of process-interferent mono-, and di-, butyl phosphates, and butyl alcohols, as well as the fission products, which constitute a radiation hazard to operating personnel. This is done conveniently and efficiently by washing the spent extractant with aqueous nitric acid, then with aqueous sodium hydroxide or sodium carbonate, followed by a water wash to remove entrained soda ash or alkali. Two continuous countercurrent washes of the organic volume with $\frac{1}{10}$ volumes of 1-3 molar $HNO_3$, followed by a pair of washes with $\frac{1}{10}$ volumes of 1-2 molar NaOH, followed by a similar pair of water washes, has proven eminently effective in removing substantially all tributyl phosphate hydrolysis products, and reducing fission product radioactivity by a factor of about 100. Like treatment of new extractant, if contaminated with hydrolysis products and the like as received, is in order; washing with NaOH, then water, suffices for new tributyl phosphate, while $HNO_3$, plus water, washing is appropriate for new non-polar organic diluent.

A more specific and detailed insight into the present process is quickly afforded by consideration of the precise operation defined by the flow-sheet presented in the appended drawing. While conducting the present invention in accordance with the foregoing general outline is, of course, not limited to all of the specific processing parameters designated in the flow-sheet, the system illustrated has proven to be particularly efficacious for the purpose. In the drawing, procedure is outlined for conducting the basic extraction-stripping cycle of the instant process, with indication of quantitative uranium, plutonium, and fission-product concentrations typifying application of the cycle to solutions derived by simple nitric acid dissolution of contaminated uranium conglomerates of the sort represented in Table I. On the whole, the flow-sheet is self-explanatory. For enhanced clarity, operational steps—particularly, the extraction and stripping operations—are designated by square-cornered frames, while solution compositions are designated within rounded-cornered frames; aqueous solution compositions are designated by single bordered frames, and organic solutions by double bordered frames. The contacting columns, as shown, are vertical and elongated; each may conventionally be either a packed-column (i.e. a column filled with an openwork bed of small, inert elements of large surface area per unit of volume) or a pulse-column (i.e. a column spaced by a plurality of horizontal, perforated diaphragms; column contents are periodically surged upwardly and downwardly, by pumping means, being thereby turbulently admixed upon jetting through the diaphragm perforations). Alternatively, other conventional, multi-stage solvent extraction apparatus, such as mixer-settlers, or batteries of separatory funnels, may be employed in place of either or both columns. Representative packed-column design dimensions, appropriate for processing ca. 5 kilograms of contaminated uranium per day, are set forth in Table II below for each of the column sections designated in the drawing.

*Table II*

[Suitable for processing ca. 5 kg. contaminated U per day]

| Column Identity (section) | Type | Inside Diameter (in.) | Contact Height (ft.) | Mass Velocity (gal./ft.²/hr.) (both phases) | |
|---|---|---|---|---|---|
| Extraction Column: | | | | | |
| Extraction Selection | packed[1] | 1.61 | 17.5 | 200-240 | ¼″ x ⅜″ stainless steel split rings. |
| Scrub Section | packed[1] | 1.61 | 5.0 | | |
| Stripping Column | packed[1] | 2.469 | 18 | 85-100 | |

[1] In place of packed columns, pulse columns of same diameter but ½ to ⅓ as tall, the columns being spanned by horizontal diaphragms ca. 2 in. apart and perforated with ⅛ in. diameter holes on ¼ in. triangular spacings wherein column contents are periodically displaced upwardly and downwardly at ca. 60 cycles per minute through ca. 1 inch amplitude, are appropriate.

The sequence and details of the operations outlined in the flow-sheet are self-evident upon the background of the foregoing discussion. The identities of the columns are plainly labelled; so are the solutions entering and leaving the columns, and their compositions and relative volumes (basis: feed volume equals 100). Considering that an extractant of specific gravity appreciably less than 1 is being employed, such that, in the columns, all aqueous solution streams descend while the organics ascend, from their points of introduction, the nature of the flow sheet streams in countercurrent contact readily appears; hence in the extraction column, extraction is effected in the lower portion, and extract scrubbing takes place in the upper, while the uranium is stripped throughout the whole of the stripping column. Naturally, if an extractant of specific gravity greater than 1 were employed, the points of introduction throughout the pair of columns would simply be inverted. Operation of all columns is continuous. Particularly noteworthy is the optional introduction of ferrous sulfamate 1, along with the nitric acid, as the scrubbing solution to the top of the scrubbing section of the extraction column, to mitigate plutonium co-extraction by reducing it to the trivalent state. As an alternative option (not shown), an oxidant for oxidizing $Pu^{+4}$ to the less-extractable $Pu^{+6}$ state, also to mitigate co-extraction of plutonium, for example, 0.05 molar ceric ammonium sulfate plus 0.05 molar sodium dichromate, may be incorporated into the scrub in place of the ferrous sulfamate shown. As a second alternative option (also not shown), the aforesaid optional reductant—ferrous sulfamate—or the optional oxidant—ceric ammonium sulfate plus sodium dichromate—may be introduced directly to the feed solution 2, again to mitigate co-extraction of plutonium, and thereupon the feed may be introduced to the top of the extraction column, eliminating introduction of the scrub solution 3, and dispensing entirely with all scrubbing in the operation.

Considering, in more detail, the special aspects and incorporated refinements of the flow-sheet, the operation commences by a contacting of the initial aqueous, contaminated uranium feed solution 2, with the organic extractant 4, in the extraction column, to effect preferential uranium extraction in accordance with the present invention. The extraction conditions indicated in the flow-sheet have been optimized toward simultaneously achieving high uranium extraction yield, and very low extraction yields of plutonium and fission products, by means of maintaining the ultimate saturation of the extract above 70% saturated in uranium. Focalizing upon the particularly critical ultimate relative saturation of the extractant in uranium, the maximum 100% saturation concentrations of uranium attainable in extractants consisting of tributyl phosphate plus hexane in dilutions ranging from 1% to 50% and with 0.16 N $HNO_3$ in the aqueous phase are tabulated in Table III below. Here, highly-concentrated, aqueous uranyl nitrate solutions were equilibrated with equal volumes of the extractant for a period so long as 22 hours. Under such conditions of great excess of aqueous uranium concentration, the measured ultimate uranium concentrations attained in the organic phase are deemed to represent 100% saturation. That the uranium concentrations attained in the extractant do represent maximum saturation, rather than merely a distribution equilibrium, becomes apparent upon comparing "Equilibration No. 4" with "Part B" which sets forth the results of a similar equilibration commencing with a much more dilute aqueous uranium concentration; it is clear that the uranium distribution coefficient would have permitted a much higher organic concentration in "Equilibration No. 4," indicating that the organic concentration actually attained represents saturation.

Table III

URANIUM SOLUBILITY (SATURATION) IN TRIBUTYL PHOSPHATE-HEXANE MIXTURES

Part A:
Aqueous Phase: Saturated (558 g./l.) $UO_2(NO_3)_2$; 0.16 N $HNO_3$
Organic Phase: Equal volume of tributyl phosphate-hexane mixture, as indicated.
Equilibrium Time: 22 hours at 20° C.±0.2°.

| Equilibration No. | Concentration of Tributyl Phosphate | | U Distribution | | | Moles Tributyl Phosphate per mole U |
|---|---|---|---|---|---|---|
| | | | Organic | | Aqueous | |
| | Percent vol. | moles/l. | g./l. | moles/l. | g./l. | |
| 1 | 1 | 0.036 | 4.12 | 0.0172 | 480 | 2.1 |
| 2 | 5 | 0.180 | 20.75 | 0.0871 | 520 | 2.08 |
| 3 | 10 | 0.360 | 41.0 | 0.1722 | 498 | 2.11 |
| 4 | 15 | 0.540 | 63.5 | 0.267 | 460 | 2.02 |
| 5 | 20 | 0.720 | 84.0 | 0.352 | 440 | 2.05 |
| 6 | 30 | 1.080 | 116.0 | 0.487 | 410.4 | 2.22 |
| 7 | 50 | 1.80 | 195.0 | 0.819 | 326.0 | 2.2 |

Part B:
Aqueous Phase: 28 g./l. U [0.12 M $UO_2(NO_3)_2$]; 0.1 M $HNO_3$
Organic Phase: 15% tributyl phosphate in hexane
Equilibration: One equal volume; 2 hours at 20° C.±0.2°.
U Distribution Coefficient: (moles in organic/moles in aqueous): 0.39

It is noteworthy in Table III that within experimental precision, extractant saturation approximates ½ mole uranium per mole of tributyl phosphate, regardless of the extractant dilution; the generally critical 70% saturation therefore is of the order of 0.35 mole uranium per mole tributyl phosphate and the practical optimum of 80 to 90% saturation referred to above is equivalent to .40 to .45 mole uranium per mole of tributyl phosphate.

To transcend the specified 70% saturation, the contact of the extractant with the aqueous solution simply continued until this desired saturation is achieved; this then generally controls the duration of contact per stage and/or the number of contacting stages employed in the extraction. High extraction of uranium per contact stage, which facilitates rapid and ready achievement of the 70% saturation, is favored by high aqueous nitrate concentration, either $HNO_3$ or $NaNO_3$, as well as by high aqueous uranium concentration, but is somewhat detracted from by the presence of sulfate and/or phosphate ions in the aqueous solution, as is shown by the data presented in Table IV below.

Table IV

EFFECT OF $HNO_3$, $NaNO_3$, U, $SO_4^=$, AND $PO_4^=$ CONCENTRATIONS ON URANIUM DISTRIBUTION COEFFICIENTS

Part A:
Aqueous Phase: 28 g./l. U [0.12 M $UO_2(NO_3)_2$]; varying acidities; indicated amounts of $Na_2SO_4$ and $Na_3PO_4$
Organic Phase: 15+ tributyl phosphate in hexane
Equilibration: Equal volumes; 2 hours at 20° C.±0.2°.

| $HNO_3$ in Feed, M | Uranium Distribution Coefficients | | | |
|---|---|---|---|---|
| | No $SO_4^=$ or $PO_4^=$ | 0.2 M $SO_4^=$ | 0.1 M $PO_4^=$ | 0.1 M $PO_4^=$ 0.2 M $SO_4^=$ |
| 0.02 | 0.22 | 0.039 | (¹) | (¹) |
| 0.1 | 0.39 | 0.097 | (¹) | (¹) |
| 0.5 | 1.11 | 0.49 | (¹) | (¹) |
| 1.0 | 2.40 | 1.37 | 1.12 | 0.66 |
| 2.1 | 5.77 | 3.49 | 2.46 | 2.01 |
| 3.1 | 8.83 | 6.50 | 3.96 | 3.48 |
| 5.2 | 12.8 | 9.17 | 6.26 | 4.97 |
| 8.0 | 7.90 | 5.91 | 4.63 | 4.25 |

¹ Complete solution not readily obtained at these acidities.

Part B:
Aqueous Phase: 0.09 M $UO_2(NO_3)_2$
Organic Phase: 20% tributyl phosphate in hexane
Equilibration: Equal volumes; 18 hrs. at 20° C.

| $NaNO_3$ conc. M | 0.0 | 0.1 | 0.25 | 0.5 | 1.0 | 2.0 | 3.0 |
|---|---|---|---|---|---|---|---|
| U Distrib. Coeff. | 0.24 | 0.45 | 0.91 | 1.67 | 4.19 | 16.9 | 46.8 |

Part C:
Aqueous Phase: $UO_2(NO_3)_2$, concentration as indicated
Organic phase: 20% tributyl phosphate in hexane
Equilibration: Equal volumes; 18 hrs. at 20° C.±0.2°.

| Initial U conc. M | 0.045 | 0.088 | 0.181 | 0.356 | 0.50 | 0.93 | 1.87 | 2.28 |
|---|---|---|---|---|---|---|---|---|
| U Distrib. Coeff. | 0.11 | 0.23 | 0.43 | ¹ 0.65 | 0.64 | 0.56 | 0.26 | 0.20 |

¹ Organic about saturated in uranium at this point, resulting in apparent drop in distribution coefficients upon further increases in U concentration.

Disadvantageously, however, such high nitrate ion concentration concomitantly promotes increased extraction of plutonium values and fission product values—where each is present alone in aqueous solution—at distribution coefficients which increase with increase in the proportion of tributyl phosphate in the extractant, as demonstrated in Table V below.

Table V

EFFECT OF NITRATE CONCENTRATION ON PLUTONIUM AND FISSION PRODUCT DISTRIBUTION COEFFICIENTS

Part A:
Aqueous Phase: $HNO_3$ solution of $Pu^{+4}$ tracer
Organic Phase: Tributyl phosphate in hydrocarbon
Equilibration: Equal volumes; 20° C.

| Percent Tributyl Phosphate (by volume) | $HNO_3$ Concentration (M) | $Pu^{+4}$ Distribution Coefficient |
|---|---|---|
| 15.4 | 0.11 | 0.005 |
| | 0.30 | 0.06 |
| | 0.50 | 0.13 |
| | 0.82 | 0.40 |
| | 1.1 | 0.83 |
| | 1.6 | 1.54 |
| | 2.03 | 1.75 |
| | 2.3 | 2.85 |
| | 3.1 | 3.54 |
| | 3.9 | 6.02 |
| 2.05 | 1.85 | 0.04 |
| 5.13 | 1.85 | 0.31 |
| 10.27 | 1.85 | 1.45 |
| 15.40 | 1.85 | 1.90 |

Part B:
Aqueous Phase: $HNO_3$ solution of fission-product Zr tracer
Organic Phase: 15+ tributyl phosphate in hydrocarbon
Equilibration: Equal volumes; 5 mins. at 20° C.

| $HNO_3$, M | Fission Product Distribution Coefficient |
|---|---|
| 1 | 0.07 |
| 2 | 0.11 |
| 3 | 0.16 |
| 5 | 0.72 |

However, it is found that when all three components—uranium, plutonium, and fission products—are encountered together in aqueous solution, as in the instant process, it has been found that the effective uranium content, the greatest of the three by several orders of magnitude, somewhat decreases the distribution coefficients of the plutonium and fission products.

Even so, increases in aqueous nitrate concentration persist in seriously increasing plutonium and fission product extractability in cases where the extractant saturation in uranium remains below 70%. Of pivotal significance, however, upon proceeding to saturations of the extractant in uranium beyond 70% the forcefulnes in this critical region of the displacement and exclusion of plutonium and fission products from the extract by the uranium decidedly counteracts the effort of the nitrate concentration toward increasing plutonium and fission product extractability, and renders such effort practically innocuous—as is demonstrated in Table VI below.

Table VI
EFFECT OF URANIUM CONCENTRATION ON PLUTONIUM AND FISSION PRODUCT DISTRIBUTION COEFFICIENTS Part A:
Aqueous Phase: 3.0 M $HNO_3$; $Pu^{+4}$ tracer; $UO_2(NO_3)_2$
Organic Phase: 15% tributyl phosphate+85% hydrocarbon
Equilibration: Equal volumes; 20° C.

| Aqueous U Concentration (g./l.) | 20 | 40 | 80 | 100 | 200 |
|---|---|---|---|---|---|
| $Pu^{+4}$ Distribution Coefficient | 2.26 | 1.13 | 0.34 | 0.23 | 0.11 |

Part B:
Aqueous Phase: 5.2 N $HNO_3$; 20-200 g./l. U [$UO_2(NO_3)_2$]; tracer Zr
Organic Phase: 15% tributyl phosphate+85% hydrocarbon
Equilibration: Equal volumes; 5 min.; 20° C.

| Relative Saturation of Extractant in Uranium percent | 0 | 31 | 53 | 69 | 78 | 80 | 80 |
|---|---|---|---|---|---|---|---|
| Fission-Product-Distribution Coefficient | 0.7 | 0.3 | 0.088 | 0.030 | 0.028 | 0.031 | 0.024 |

Thus, above 70% saturation, since increased aqueous nitrate concentration, by promoting high uranium saturation of the extractant, is particularly effective in thereby barring plutonium and fission products from the extractant, the rather high feed solution nitrate ion concentration indicated in the flow-sheet is desirable in the interest of high yield and separaiton efficiency in the extraction.

Proceeding, the resulting extract ascends the extraction column to its upper portion, where it encounters the scrub solution 3, in countercurrent contact. As manifested in the foregoing tables, the selected $HNO_3$ concentration of 3 normal in the scrub solution is just about strong enough to hold the bulk of uranium in the extract, while affording fission product distribution coefficients sufficiently favoring the aqueous phase to remove about 50 to 75% of whatever small amount of fission products had been taken up by the extract.

Where the indicated option of incorporating a reductant such as ferrous sulfamate 1, or an oxidant such as ceric ammonium sufate plus sodium dichromate, in the scrub solution is pursued, the resulting plutonium distribution coefficients so especially disfavor the organic phase that virtually all plutonium coextraction is eliminated; pertinent distribution coefficients for of $Pu^{+3}$ and $Pu^{+6}$ states, as determined, are presented in Table VII below.

Table VII
EFFECT OF PLUTONIUM OXIDATION STATE ON ITS DISTRIBUTION COEFFICIENT Part A:
Organic Phase: 15% tributyl phosphate+85% hydrocarbon
Uranium [as $UO_2(NO_3)_2$]=38 g./l.
$Pu^{+4}$; $1.2 \times 10^{-5}$ M
Aqueous Phase: $HNO_3$ solution of 0.04 M Fe [$NH_2SO_3$]$_2$
Equilibration: 3 volumes organic; 1 aqueous; 5 min.

| $HNO_3$ in aqueous (M) | 0.5 | 1.0 | 1.5 | 3.0 |
|---|---|---|---|---|
| $Pu^{+3}$ Distribution Coefficient | 0.001 | 0.0012 | 0.0012 | 0.0017 |

Part B:
Aqueous Phase: $HNO_3$ solution of Pu tracer; $UO_2(NO_3)_2$ as indicated
Organic Phase: Tributyl phosphate+hydrocarbon
Equilibration: Equal volume; 20° C.

| Aqueous | | Organic Tributyl Phosphate (Percent) | Distribution Coefficients | |
|---|---|---|---|---|
| $HNO_3$ (M) | U (g./l.) | | $Pu^{+3}$ | $Pu^{+6}$ |
| 1.1 | 0 | 15.4 | 0.03 | 0.51 |
| 2.03 | 0 | 15.4 | | 1.01 |
| 3.1 | 0 | 15.4 | | 1.4 |
| 1.85 | 0 | 5.13 | | 0.21 |
| 1.85 | 0 | 10.27 | | 0.58 |
| 1.85 | 0 | 15.4 | | 0.95 |
| 3.0 | 20 | 15 | | 0.91 |
| 3.0 | 80 | 15 | | 0.16 |
| 3.0 | 200 | 15 | | 0.04 |

In the stripping column operation, simple countercurrent contact of about a half dozen stages with about an equal volume of water 5, has proven effective for removal of virtually all uranium from the resulting scrubbed extract 6. Use of plain water, without the assistance of a little incorporated sulfuric acid, for the stripping is preferred at this point to avoid interference from the $H_2SO_4$ in future uranium processing operations. Table VIII below demonstrates the uranium distribution coefficients obtained upon stripping with water, and indicates that only a few stages of stripping with plain water are all that are necessary to recover substantially all uranium from the resulting scrubbed extract.

Table VIII
URANIUM DISTRIBUTION COEFFICIENTS UPON STRIPPING

Organic Phase: Tributyl phosphate+hexane
(2.3 g. U per liter tributyl phosphate)
Aqueous Phase: Equal volumes of water

| Tributyl Phosphate (Percent) | Uranium Distribution Coefficients | | | |
|---|---|---|---|---|
| | 1st Strip | 2nd Strip | 3rd Strip | 4th Strip |
| 5 | 0.09 | | | |
| 15 | 0.49 | 0.01 | 0.01 | 0.01 |
| 20 | 1.06 | 0.48 | 0.06 | 0.02 |
| 25 | 0.97 | 0.18 | 0.17 | 0.03 |

The aqueous product solution of stripped uranium 7, from the stripping column, being quite dilute, is readily concentratable to 400 grams uranium per liter or so, by evaporation, which concentration represents a volume reduction of the solution of greater than 10 to 1. For this, a 6 ft. high by 8 in. diameter, vertical, cylindrical evaporator tank (not shown), with a tantalum bayonet heater inserted in the bottom end and supplied with high pressure steam, has proven capable of so concentrating the dilute uranium product solution at a processing rate of approximately 15 gallons per hour. Product concentrate is collected continuously from the bottom of the evaporator, while the vapor passes from the top of the evaporator into a tantalum-lined condenser, to be condensed and discarded.

For similar concentration of the aqueous raffinate 8, from the extraction column for compact storage, it has been found convenient to effect such evaporation continuously by boiling the aqueous raffinate in a constant-volume stillpot, until incipient crystallization is approached, and passing the vapors into a 4-inch-diameter by 15-foot-high continuous compound distillation column, packed with ½ in. x ½ in. Raschig rings, and operated under partial reflux. Constant boiling nitric acid (65%) overflows from the bottom of the column, while dilute $HNO_3$ (ca. 1%) overflows from the top.

Further illustration of the quantitative aspects and preferred reagents, conditions, and procedures of the present process is provided in the following specific examples. In Example I, the efficacy of the basic procedure of the flow-sheet is demonstrated by a short experimental run employing countercurrent batch extractors (batteries of separatory funnels) in place of columns, a more concentrated uranium feed solution, and somewhat different flow ratios among the various liquid streams.

EXAMPLE I

A quantity of aqueous, contaminated uranium solution, approximating that derivable by nitric acid dissolution of conglomerates as described in Table I, supra, was procured. As finally prepared and determined, the solution had a uranium concentration of 130 grams per liter, a nitric acid concentration of 3.6 normal, fission-product activity of $4 \times 10^6$ beta count per minute per milliliter, and a concentration of $Pu^{+4}$ of ca. $10^{-6}$ molar. Following generally the basic procedure outlined in the flow-sheet in the drawing, the aqueous solution was subjected to countercurrent extraction whereupon the extract was subsequently scrubbed, in a countercurrent batch extractor having five separate extraction stages and four scrub stages. The extractant employed was a mixture of 15% by volume tributyl phosphate and 85% hexane. The scrubbing solution was aqueous 3 M $HNO_3$. The resulting scrubbed extract was continuously passed into a 5 stage countercurrent batch extractor where it was stripped with water. Employed as the flow ratios among the several solution streams involved were extractant:feed:scrub:strip equals 10:3:2:10. The stripped decontaminated uranium product solution was chemically analyzed for uranium, and radiometrically analyzed for plutonium, gross fission product content, and content of various significant individual fission-product species; comparing the analysis of the product solution with that of the initial feed solution; the percentage uranium loss and the overall decontamination factors afforded were calculated. Results are tabulated in Table IX below.

Table IX

REPRESENTATIVE COUNTERCURRENT BATCH RUN

Overall uranium loss _____ 0.4%.
Decontamination factors: [1]
    Gross $\beta$ _____ $2 \times 10^4$.
    Gross $\gamma$ _____ $1 \times 10^4$.
    Ru $\beta$ _____ $1.5 \times 10^4$.
    Ce $\beta$ _____ $5 \times 10^4$.
    Nb $\beta$ _____ $\begin{cases} 3 \times 10^3. \\ 3 \times 10^4. \end{cases}$
    Pu $\alpha$ _____ 10.
$\beta$ activity of product _____ 2 counts/min./mg. U.

[1] Decontamination Factor $= \frac{\text{Amount of contaminant associated with U before}}{\text{Amount of contaminant associated with U after}}$ Readily apparent from Table IX is the 99.6% uranium recovery, with elimination of 90% of its original plutonium contamination, together with a gross fission product decontamination factor of the order of $10^4$, afforded by a simple, single basic cycle of the present invention.

The efficacy of the flow-sheet procedure when applied to larger, more practical scaled operation, employing packed extraction and stripping columns, and utilizing the indicated optional incorporation of a plutonium reductant in the scrubbing solution, is demonstrated by a pair of representative half-week-long runs in the following Example II.

EXAMPLE II

A pair of quantities of aqueous nitric acid solution of contaminated uranium, much the same as that employed in Example I, were procured. Upon final preparation and analysis, both chemical and radiometric, these quantities of solution quite closely approximated the feed solution conditions indicated in the flow-sheet. Each quantity of solution was separately treated to a continuous processing for decontamination and recovery of uranium substantially as indicated in the flow-sheet in the drawing, including the optional step 1, of incorporating ferrous sulfamate to 0.05 molar in the scrubbing solutions, and employing packed extraction and stripping columns substantially as described in Table II supra. Chemical and radiometric analyses were made, during the runs, of the extraction raffinate, scrubbed extract, stripped product, and spent extractant, and overall uranium loss, material balance, and decontamination factors were calculated. The obtained analytical results, together with further details, are tabulated in Table X below.

Table X

REPRESENTATIVE COLUMN RUNS—FLOWSHEET, WITH OPTIONAL INCORPORATION OF REDUCTANT IN SCRUB

| | Run A | Run B |
|---|---|---|
| Columns (length of packed sections) (ft.): | | |
|   Extraction | 17.5 | 17.5 |
|   Scrub | 5.0 | 5.0 |
|   Strip | 18.0 | 18.0 |
| Feed Stream: | | |
|   Uranium (g./l.) | 61.2 | 58.0 |
|   $H^+$ (N) | 2.95 | 2.98 |
|   $PO_4^{\equiv}$ (M) | 0.275 | 0.125 |
|   $SO_4^=$ (M) | 0.13 | 0.44 |
|   $NO_3^-$ (N) | 4.2 | 4.6 |
|   Gross $\beta$ (cts./min./mg. U) | $1.19 \times 10^5$ | $1.19 \times 10^5$ |
|   Gross $\gamma$ (mv./mg.l)[1] | 52.0 | 53.3 |
|   Pu $\alpha$ (cts./min./mg. U) | 30.6 | 21.8 |
|   Flow rate (cc./min.) | 60 | 60 |
| Scrubbing Stream: | | |
|   $H^+$ (N) | 3.1 | 3.05 |
|   Fe $(NH_2SO_3)_2$ (M) | 0.05 | 0.05 |
|   Flow rate (cc./min.) | 30 | 30 |
| Extractant Stream: | | |
|   Tributyl phosphate (Percent) | 13 | 13 |
|   Hydrocarbon (Percent) | 87 | 87 |
|   Flow rate (cc./min.) | 108 | 108 |
| Stripping Stream: Flow rate (cc./min.) | 120 | 120 |
| Flow Ratios: Feed: Scrub: Extractant: Strip | 1:05:1.8:2.0 | 1:05:1.8:2.0 |
| Extract: | | |
|   Uranium (g./l.) | 35.4 | 33.5 |
|   $H^+$ (N) | 0.10 | 0.11 |
|   Gross $\beta$ (cts./min./mg. U) | 14.9 | 15.1 |
| Raffinate: | | |
|   Uranium (g./l.) | 0.06 | 0.04 |
|   $H^+$ (N) | 2.77 | 2.75 |
|   Gross $\beta$ (cts./min./ml.) | $5.2 \times 10^6$ | $5.0 \times 10^6$ |
| Stripped Product: | | |
|   Uranium (g./l.) | 34.9 | 34.0 |
|   $H^+$ (N) | 0.13 | 0.14 |
|   Gross $\beta$ (cts./min./mg. U) | 4.5 | 7.1 |
|   Gross $\gamma$ (mv./mg. U) | $2.0 \times 10^{-3}$ | $2.9 \times 10^{-3}$ |
|   Ru $\beta$ | 2.9 | 3.3 |
|   Pu $\alpha$ (cts./min./mg. U) | 0.66 | 0.97 |
| Spent Extractant: | | |
|   Uranium (g./l.) | 0.01 | 0.015 |
|   $H^+$ (N) | 0.005 | 0.005 |
|   Gross $\beta$ (cts./min./ml.) | 315 | 300 |
| Uranium Loss, Percent: | | |
|   Raffinate | 0.14 | 0.11 |
|   Spent Extractant | 0.03 | 0.05 |
|   Total | 0.17 | 0.16 |
| Material Balance, Percent | 114 | 117 |
| Decontamination Factors (overall) | $\begin{cases} 2.7 \times 10^4 \\ 2.6 \times 10^4 \\ 46 \end{cases}$ | $\begin{cases} 1.7 \times 10^4 \\ 1.8 \times 10^4 \\ 23 \end{cases}$ |

[1] mv = millivolts indicated on ionization chamber with the following fission-product calibration, relative to their $\beta$ activity;
  $^{95}$: $3.57 \times 10^{-3}$ mv./$\beta$ count
  $^{95}$: $2.78 \times 10^{-2}$
  Ru 40° $Ru^{106}+60\%$ $Ru^{103} 2.06 \times 10^{-3}$
  Total rare earths: $3.33 \times 10^{-4}$.

As indicated, the eminent uranium yield of over 99.8%, with elimination of from 96% to 98% of the initial plutonium contamination, together with fission product decontamination factors of the high order of $2 \times 10^4$ were accomplished in Example II; in addition, the uranium was freed of all detectable trace of sulfates and phosphate ion. In Example III, following, modification of the process involving elimination of the scrubbing operation and incorporation of the plutonium reductant directly into the feed solution, in order to effect considerable savings in the nitric acid requirements of the process at the expense of a considerable decrease in the fission product decontamination factors afforded—which nevertheless in some cases is tolerable—is similarly demonstrated by an analogous pair of half-week-long, larger-scale runs.

EXAMPLE III

Another pair of quantities of contaminated uranium solution, substantially the same as those employed in Example II, were again procured, prepared, and analyzed, and found to closely approximate the feed solution condition indicated in the flow-sheet. These quantities were separately subjected to a uranium decontamination and recovery operation, similar to that shown in the appended flow-sheet, with the exception that no scrub solution was employed but rather the feed solution was introduced directly into the top of the extraction column. An aqueous 0.4M ferrous sulfamate solution was injected into the feed stream at a volumetric flow rate of $\frac{1}{12}$ that of the feed stream. Packed extraction and stripping columns, substantially as described in Table II, supra, were employed; in the case of the extraction column, all of the 22.5 feet height was employed for extraction, in view of the elimination of the scrubbing operation. The relative flow ratios of the remaining feed streams were varied somewhat from those indicated in the flow-sheet, toward compensating for the elimination of the scrub; as indicated, the ratios were somewhat different between the two runs here. Analytical results, together with further details, are tabulated in Table XI below.

Table XI

REPRESENTATIVE COLUMN RUNS—FLOWSHEET: SCRUB ELIMINATED; INCORPORATION OF REDUCTANT IN FEED

|  | Run A | Run B |
|---|---|---|
| Columns (length of packed sections) (ft.): |  |  |
| Extraction | 22.5 | 22.5 |
| Scrub | 0 |  |
| Strip | 18.0 | 18.0 |
| Feed Stream: |  |  |
| Uranium (g./l.) | 58.9 | 55.9 |
| H+ (N) | 2.9 | 2.9 |
| $PO_4^{\equiv}$ (M) | 0.13 | 0.12 |
| $SO_4^{-}$ (M) | 0.40 | 0.32 |
| $NO_3^{-}$ (N) | 4.4 | 4.4 |
| Gross β (cts./min./mg. U) | $0.94 \times 10^5$ | $1.09 \times 10^5$ |
| Gross γ (mv./mg. U) | 56.0 | 61.4 |
| Pu α (cts./min./mg. U) | 22.8 | 29.0 |
| Flow rate (cc./min.) | 60 | 60 |
| Plutonium Reductant: |  |  |
| Identity | $Fe(NH_2SO_3)_2$ | $Fe(NH_2SO_3)_2$ |
| Concentration (M) | 0.03 | 0.03 |
| Extractant Stream: |  |  |
| Tributyl Phosphate, Percent | 13 | 14 |
| Hydrocarbon, Percent | 87 | 86 |
| Flow rate (cc./min.) | 90 | 75 |
| Stripping Stream: Flow rate (cc./min.) | 100 | 80 |
| Flow Ratios: Feed: Extractant: Strip | 1:1.38:1.54 | 1:1.51:1.23 |
| Extract: |  |  |
| Uranium (g./l.) | 43.4 | 45.7 |
| H+ (N) | 0.11 | 0.10 |
| Gross β (cts./min./mg. U) | 37.0 | 26.2 |
| Raffinate: |  |  |
| Uranium (g./l.) | 0.001 | 0.01 |
| H+ (N) | 2.65 | 2.94 |
| Gross β (cts./min./ml.) | $5.6 \times 10^6$ | $6.5 \times 10^6$ |
| Stripped Product: |  |  |
| Uranium (g./l.) | 39.9 | 42.8 |
| H+ (N) | 0.12 | 0.10 |
| Gross β (cts./min./mg. U) | 28.4 | 32.7 |
| Gross γ (mv./mg. U) | 6 | 6 |
| RU β | 11.8 | 13.5 |
| Pu α (cts./min./mg. U) | 0.45 | 0.21 |
| Spent Extractants: |  |  |
| Uranium (g./l.) | 0.001 | 0.001 |
| H+ (N) | 0.001 | 0.001 |
| Gross β (cts./min./ml.) | 221 | 560 |
| Uranium Loss (Percent): |  |  |
| Raffinate | 0.001 | 0.021 |
| Spent Extractant | 0.001 | 0.001 |
| Total | 0.002 | 0.022 |
| Material Balance (Percent) | 113 | 102 |
| Decontamination Factors (Overall) | $0.3 \times 10^4$ / $0.9 \times 10^4$ | $0.3 \times 10^4$ / $1.1 \times 10^4$ |
| Pu | 51 | 138 |

As indicated, the eminent uranium yield of well over 99.9%, with the removal of plutonium contamination being so high as 98% to 99.3%, together with fission product decontamination factors of the order of $3 \times 10^3$ to $1 \times 10^4$, were accomplished in Example III.

Although this invention has been described with particular emphasis upon the developed flow-sheet, suitable for plant-scale application, outlined in the drawings, it is inherently susceptible to a wire variety of alterations. For example, in place of the optional ferrous sulfamate addition to the scrubbing solution, other similarly-appropriate plutonium reductants, or else oxidants for oxidizing $Pu^{+4}$ to $Pu^{+6}$ may alternatively be incorporated; similarly such alternative agents may well be incorporated in the feed solution, in instances where the scrubbing operation is eliminated and the feed is introduced to the top of the extraction column as in Example III. Of course, ferrous sulfamate or such other reductants or oxidants, may optionally be introduced, instead, directly into the feed solution, for improved plutonium decontamination, where the scrub operation is retained as shown; likewise, compatable reductants or compatable oxidants may be introduced simultaneously into both the scrub and the feed solutions. Moreover, while particular application of this process to contaminated uranium solutions derived from accumulated conglomerates as outlined in Table I has been emphasized, its applicability naturally extends to similar contaminated uranium solutions of any other derivation, such as those derived from neutron-irradiated uranium metal contaminated with considerable plutonium and fission-product values, where the plutonium for one reason or another is not desired to be separately recovered away from fission products. Other variations in procedure and processing parameters, to favor certain advantages somewhat at the expense of others, as well as diverse other applications of the instant invention, will become apparent to those skilled in the art, especially on the basis of the measured distribution coefficients and similar data set forth in the tables presented supra. It is, therefore, to be understood that all matters contained in the above description and examples are illustrative only and do not limit the scope of the present invention.

Cross reference is made to a co-pending application of the instant co-inventors, together with William B. Lanham, Jr., S.N. 303,691, filed August 11, 1952, now abandoned, for Process for Segregation of Plutonium, Uranium, and Fission Product Values, which is directed to a related process in which both plutonium and uranium values are simultaneously extracted away from fission product contamination, and thereupon are subsequently separated from one another by preferential stripping. It is noteworthy at this point that this latter process is applicable to the same sort of accumulated conglomerate as alluded to hereinbefore, in cases where its plutonium content is present in sufficient amounts to warrant its separate recovery; in the usual case, however, where the plutonium content is too dilute to warrant separate recovery at the moment, application of the instant process is appropriate. Further cross-reference is made to the following co-pending applications of the common assignee directed to other related subject matter:

Ser. No. 746,870, filed May 8, 1946, in the names of Herbert H. Anderson and Larned B. Asprey, for "Solvent Extraction Process for Plutonium," now U.S. Patent No. 2,924,506, issued February 9, 1960; and Ser. No. 142,707, filed February 6, 1950, in the name of James C. Warf, for "Process of Separating Uranium," now U.S. Patent No. 2,848,300, issued August 19, 1958.

What is claimed is:

1. A new and improved process for segregating and separately recovering uranium values, from an initial aqueous solution containing the same together with plutonium and fission product values, which comprises intimately contacting said initial solution, while maintaining a substantial concentration of nitric acid in the solution, with an organic extractant comprising a minor volumetric proportion of a substantially water-immiscible liquid tri-alkyl phosphate, dissolved in a major volumetric proportion of a substantially water-immiscible, liquid, non-polar, saturated organic solvent, and controlling the relative amounts of tri-alkyl phosphate and uranium values in said solutions in contact to achieve a concentration of uranium values in said organic extractant of at least 0.35 mole of uranium per mole of tri-alkyl phosphate, thereby preferentially extracting uranium values into the organic phase, separating the resulting uranium-bearing organic extract from the remaining plutonium-containing, and fission-product-containing aqueous raffinate, thereupon intimately contacting the separated uranium-bearing organic extract with water, thereby stripping uranium values therefrom, and thereafter separating the resulting stripped-uranium-containing aqueous phase from the spent organic extractant.

2. The process of claim 1 wherein said liquid tri-alkyl phosphate contains at least 12 carbon atoms among the alkyl radicals of its molecules.

3. The process of claim 1 wherein said liquid tri-alkyl phosphate is tri-n-butyl phosphate.

4. The process of claim 1 wherein said organic extractant comprises 5 to 50% by volume of tri-n-butyl phosphate, dissolved in the remaining percentage volume of substantially water-immiscible liquid paraffinic hydrocarbon.

5. The process of claim 1 wherein said organic extractant comprises approximately 15% by volume of tri-n-butyl phosphate, dissolved in the remaining percentage by volume of substantially water-immiscible liquid paraffinic hydrocarbon.

6. The process of claim 1 wherein said liquid tri-alkyl phosphate is tri-n-butyl phosphate, and upon said intimate contacting of said initial aqueous solution with the organic extractant, said uranium values are present in said aqueous solution in uranyl oxidation state in concentration within the approximate range of 0.05 to 1.5 molar, and said substantial concentration of nitric acid therein is within the approximate range of 1 to 7 molar.

7. The process of claim 1 wherein said liquid tri-alkyl phosphate is tri-n-butyl phosphate, and, upon said intimate contacting of said initial aqueous solution with the organic extractant, said uranium values are present therein in uranyl oxidation state in concentration of approximately 0.25 molar, said plutonium values are present therein in concentration of the order of $10^{-5}$ to $10^{-7}$ molar, said fission product values are present therein in concentration of the order of $10^{-4}$ to $10^{-6}$ molar, and said substantial concentration of nitric acid therein is approximately 3 molar.

8. The process of claim 1 wherein said liquid tri-alkyl phosphate is tri-n-butyl phosphate, said intimate contacting of the uranium-bearing organic extract with water is effected with water containing a little sulfuric acid dissolved therein.

9. The process of claim 1 wherein said relative amounts of tri-alkyl phosphate and uranium values are controlled to achieve a concentration of uranium values in said organic extractant within the range of 0.40 to 0.45 mole of uranium per mole of tri-alkyl phosphate.

10. A new and improved process for segregating and separately recovering uranium values, from an initial aqueous feed solution containing the same together with plutonium and fission product values, which comprises intimately contacting said solution, while maintaining a substantial concentration of nitric acid in the solution, with an organic extractant comprising a minor volumetric proportion of tri-n-butyl phosphate, dissolved in a major volumetric proportion of a substantially water-immiscible liquid, non-polar, saturated, organic solvent, and controlling the relative amounts of tri-n-butyl phosphate and uranium values in said solutions in contact to achieve a concentration of uranium values in said organic extractant of at least 0.35 mole of uranium per mole of tri-n-butyl phosphate, thereby preferentially extracting uranium values into the organic phase, separating the resulting uranium-bearing organic extract from the remaining plutonium-containing and fission-product-containing aqueous raffinate, then intimately contacting the separated organic extract with aqueous nitric acid to thereby scrub out into the aqueous nitric acid much of any extracted fission-product values, separating the resulting scrubbed uranium-bearing organic extract from the aqueous nitric acid, thereupon intimately contacting the separated uranium-bearing organic extract with water, thereby stripping the uranium values therefrom, and thereafter separating the resulting stripped-uranium-containing aqueous phase from the spent organic extractant.

11. The process of claim 10 wherein said aqueous nitric acid employed to scrub the organic extract is approximately 3 molar nitric acid.

12. A new and improved process for segregating and separately recovering uranium values, from an initial aqueous solution containing the same together with plutonium and fission product values, as well as sulfate and phosphate ions in fractional molarity, which comprises intimately contacting said solution, while maintaining a substantial concentration of nitric acid in the solution, with an organic extractant comprising a minor volumetric proportion of a substantially water-immiscible liquid tri-alkyl phosphate, dissolved in a major volumetric proportion of a substantially water-immiscible, liquid, non-polar, saturated organic solvent, and controlling the relative amounts of tri-alkyl phosphate and uranium values in said solutions in contact to achieve a concentration of uranium values in said organic extractant of at least 0.35 mole of uranium per mole of tri-alkyl phosphate, thereby preferentially extracting uranium values into the organic phase, separating the resulting uranium-bearing organic extract from the remaining plutonium-containing, fission-product-containing, sulfate-containing, and phosphate-containing aqueous raffinate, thereupon intimately contacting the separated uranium-bearing organic extract with water, thereby stripping uranium values therefrom, and thereafter separating the resulting stripped-uranium-containing aqueous phase from the spent organic extractant.

13. A new and improved process for segregating and separately recovering uranium values from an initial aqueous solution containing the same together with contaminating plutonium and fission product values, which comprises intimately contacting said solution, while maintaining a substantial concentration of nitric acid in the solution and maintaining said plutonium values therein in a positive valence state selected from the group consisting of trivalent and hexavalent states, with an organic extractant comprising a minor volumetric proportion of a substantially water-immiscible liquid tri-alkyl phosphate, dissolved in a major volumetric proportion of a substantially water-immiscible liquid, non-polar, saturated organic solvent controlling the relative amounts of tri-alkyl phosphate and uranium values in said solutions in contact to achieve a concentration of uranium values in said organic extractant of at least 0.35 mole of uranium per mole of tri-alkyl phosphate, thereby preferentially extracting uranium values into the organic phase, separating the resulting uranium-bearing organic extract from the remaining plutonium-containing, and fission-product-containing aqueous solution, thereupon intimately contacting the separated uranium-bearing organic extract with water, thereby stripping uranium values therefrom, and thereafter separating the stripped-uranium-containing aqueous phase from the resulting spent organic extractant.

14. A new and improved method for segregating and separately recovering uranium values from an initial aqueous solution containing the same together with contaminating plutonium and fission product values, which comprises intimately contacting a stream of said initial solution, while maintaining a substantial concentration of nitric acid therein, with a continuous stream of an organic extractant comprising a minor volumetric proportion of a substantially water-immiscible liquid tri-alkyl phosphate, dissolved in a major proportion of a substantially water-immiscible, liquid, non-polar saturated organic solvent, and controlling the relative amounts of tri-alkyl phosphate and uranium values in said solutions in contact to achieve a concentration of uranium values in said organic extractant of at least 0.35 mole of uranium per mole of tri-alkyl phosphate, thereby preferentially extracting uranium values into the organic phase, separating the resulting uranium-bearing organic extract from the remaining plutonium-containing and fission-product-containing aqueous raffinate, then intimately contacting the separated stream of organic extract with a stream of an aqueous nitric acid solution of ceric ammonium sulfate and sodium dichromate to thereby scrub out into the aqueous nitric acid solution much of any extracted fission product values, separating the resulting scrubbed uranium-bearing organic extract from the aqueous nitric acid solution of ceric ammonium sulfate and sodium dichromate, thereupon introducing the separated stream of aqueous nitric acid solution of ceric ammonium sulfate and sodium dichromate into the oncoming stream of said initial aqueous solution commencing to undergo the aforesaid intimate contact with the extractant, thereby maintaining said plutonium values in hexavalent state in the oncoming stream of said initial aqueous solution and consequently mitigating coextraction of plutonium, thereupon intimately contacting the separated scrubbed uranium-bearing organic extract with water, thereby stripping uranium values, therefrom, and thereafter separating the stripped-uranium-containing aqueous phase from the resulting spent organic extractant.

References Cited in the file of this patent

UNITED STATES PATENTS

| | | |
|---|---|---|
| 2,227,833 | Hixson et al. | Jan. 7, 1941 |
| 2,717,696 | Schubert | Sept. 13, 1955 |
| 2,796,320 | Spedding | June 18, 1957 |
| 2,811,415 | Seaborg | Oct. 29, 1957 |
| 2,839,357 | Clark et al. | June 17, 1958 |
| 2,848,300 | Warf | Aug. 19, 1958 |
| 2,849,277 | Thomas | Aug. 26, 1958 |
| 2,882,124 | Seaborg | Apr. 14, 1959 |

OTHER REFERENCES

Warf: U.S. Atomic Energy Commission declassified document No. A.E.C.D. 2524, August 7, 1947. Copy in Scientific Library.

Smyth: A General Account of the Development of Methods of Using Atomic Energy for Military Purposes Under the Auspices of the United States Government, 1940–1945, page 99 (August 11–12, 1945). Copy in Scientific Library.